United States Patent [19]

Harmand

[11] Patent Number: 5,001,871

[45] Date of Patent: Mar. 26, 1991

[54] MACHINE FOR PRECISION MACHINING, WITH A ROD FOR THE DETERMINATION OF THE PRACTICAL MEAN AXIS OF A HOLE OF CYLINDRICAL GENERAL CONTOUR

[75] Inventor: Pierre Harmand, Annecy, France

[73] Assignee: Societe d'Etude de Realisation et de Diffusion Industrielles - SERDI, Annecy, France

[21] Appl. No.: 356,346

[22] Filed: May 24, 1989

[30] Foreign Application Priority Data

May 27, 1988 [FR] France .................. 88 07315

[51] Int. Cl.$^5$ .................................................. B24B 19/00
[52] U.S. Cl. ........................... 51/241 VS; 51/241 A; 82/172
[58] Field of Search ............... 51/241 VS, 241 A; 82/172, 160; 384/125; 166/241; 277/121, 193, 212 R, 212 F, 236

[56] References Cited

U.S. PATENT DOCUMENTS

| | | | |
|---|---|---|---|
| 2,084,175 | 6/1937 | Zimmerman | 51/241 VS |
| 2,085,280 | 6/1939 | Tyler | 51/241 VS |
| 2,200,758 | 5/1940 | Thaheld . | |
| 3,300,822 | 1/1967 | Thompson | 277/120 |
| 3,556,042 | 1/1971 | Laughlin | 166/241 |
| 4,365,917 | 12/1982 | Harmand . | |

FOREIGN PATENT DOCUMENTS

| | | |
|---|---|---|
| 903762 | 12/1953 | Fed. Rep. of Germany . |
| 1080137 | 12/1954 | France . |
| 1108959 | 1/1956 | France . |
| 1555211 | 1/1969 | France . |

Primary Examiner—Maurina Rachuba
Attorney, Agent, or Firm—Oliff & Berridge

[57] ABSTRACT

Machine for precision machining, with a rod for the determination of the practical mean axis of a hole of cylindrical general contour. The present invention relates to a machine for precision machining, in particular for the grinding of valve seatings of heat engines, which is in accordance with the described in the European Patent EP-B-No. 0,022,796. According to the invention, the pilot rod (11) comprises various annular recesses (11a), in which various rings (13) which are resiliently deformable in the radial direction are respectively mounted. The invention is applicable to all types of machines for machining necessitating the presence of a pilot rod.

14 Claims, 5 Drawing Sheets

FIG.1

MACHINE FOR PRECISION MACHINING, WITH A ROD FOR THE DETERMINATION OF THE PRACTICAL MEAN AXIS OF A HOLE OF CYLINDRICAL GENERAL CONTOUR

FIELD OF THE INVENTION

The present invention relates principally to a machine for precision machining, with a rod for the determination of the practical mean axis of a hole of cylindrical general contour. The term "machine" is intended to refer to any heavy equipment of the industrial type, such as a machine tool, but also to any light equipment of the manual type, such as tools.

The invention likewise relates, on a secondary basis, and independently, to a rod for the determination of the practical mean axis of a hole exhibiting a cylindrical general contour, but local imperfections of concentricity of the order of the customary machining tolerances, for example of the order of a few microns or less. Such a rod may form part of a machine as previously defined, in a fixed or removable manner, especially by way of a pilot rod. Such a rod may also be used for the physical determination or substantive location of the practical mean axis of a cylindrical hole, the axis thus substantively located being capable of serving for various purposes, such as metrology or the rotation of a cutting tool. This same rod may serve as measurement intermediate link, and may form part of a machining system or equipment, comprising a tool positioned in relation to the part to be machined, by virtue of the measurement of the position of the rod.

Precision machining is intended to refer to any work on a metallic part with a cutting tool, whether it be a bore, milling, tapping, grinding, or any other form of work on metals, by removal of a chip, or whether it be an abrasive tool operating by removal of metallic particles.

The present invention is presented, described and defined by reference to the grinding of valve seatings of heat engines, but it must be understood that its interpretation and its scope cannot be limited to this field of application, since, as indicated by the term "precision machining", the invention is applicable to other forms of work on metals.

PRIOR ART

Especially in the field of the grinding of valve seatings, according to the Patent No. EP-B-0,022,796, a machine for precision machining has been described and proposed, comprising:

a fixed, flat and horizontal support;

a machining head, disposed on an air cushion in relation to the flat support, and displaceable on the latter along two perpendicular directions;

a bush provided with a spherical orientation stop, mounted within the machining head;

two seatings of concave sphericity complementary to the spherical stop, one fixed and formed by the wall of the machining head, and the other movable in relation to the same wall, but disposed within the head, and capable of blocking the bush in terms of orientation;

pneumatic means permitting the lifting of the spherical stop on an air cushion, during the phase of unblocking of the movable seating;

a pin movable in rotation about its axis, and in translation along its axis, sliding in the bush;

a rotary machining tool, mounted at the free end of the pin, possibly via a tool carrier device;

a pilot rod coaxial with the axis of the pin, extending the latter at its free end;

a means for driving the pin in rotation, integral with the bush.

Such a machine has demonstrated its entire effectiveness in the grinding of valve seatings, especially with regard to the concentricity, and of the valve rod guide and of the valve seating. This results from the fact that, during the lifting of the bush on an air cushion, and before the blocking of the latter and the action of the cutting tool, it is possible to position the pin precisely in the practical axis of the valve guide, with the pilot rod engaged into the latter. This positioning results itself from the quasi-absence of frictional resistance of the equipment constituted by the bush, the tool carrier pin and the rotary driving means, in relation to the machining head, during the phase of unblocking of the movable seating and lifting of the bush.

After blocking of the bush in its equilibrium position, during the machining or grinding, the pilot rod, which is chosen and matched to the dimensional characteristics of the valve guide, rotates within the latter, and the cutting tool operates concentrically with this same guide.

This being the case, the determination of the practical mean axis of the valve guide, by virtue of the pilot rod, continues to be limited by the local defects or imperfections of concentricity of the reference cylindrical hole which is constituted by this same guide. Such defects, of the order of the customary machining tolerances, for example of a few microns or less, result both from the limitations or imperfections of the original machining and from the differential wear along the axis of the valve guide.

Even when using a pilot rod of circular cross-section very close to the mean cross-section of the valve guide, there necessarily remains a functional gap between the internal surface of the guide and the rod.

For these two reasons, the determination of the practical mean axis of the valve guide still has limitations, even if the latter are of the order of a few microns. Now, in the field of heat engines, it appears to be progressively more important, in an operation of grinding or finishing of a seating, to approach the equilibrium practical axis of the valve rod in movement, corresponding to the mean axis of the valve guide. This determines especially, in operation, the good sealing between the valve head and its seating, but also the effectiveness of the heat transfer to the head.

SUMMARY OF THE INVENTION

The object of the present invention is therefore to improve the determination of the practical mean axis of a reference hole, of cylindrical general form, while taking into account the local imperfections along the axis of the hole, although these are very small, and this taking place while maintaining the actual principle of a pilot rod closely matched to the mean cross-section of the same hole.

According to the invention, and in a general way, there is attached to the rigid pilot rod along the axis, a resilient bearing of axial extension, the unstressed external contour of which emerges at least locally above the cylindrical surface of the rod. This bearing is capable of establishing under stress, by radial and local resilient compression, a plurality, or even an infinity, of annular zones of contact between the local surface of the reference hole and the pilot rod, these annular zones being staggered along the axis of the latter.

According to a preferred but not exclusive embodiment, the resilient bearing comprises a plurality of resilient rings, staggered along the axis of the pilot rod, which are resiliently deformable in the radial direction, and the unstressed external surface of which emerges above the cylindrical surface of the rod. The radial resilient compression of these rings, under stress, permits the establishment of a series of annular contacts between the local surface of the reference hole and the pilot rod, which are staggered along the axis of the latter.

According to the invention, each one of the annular zones of contact of the resilient bearing with the local surface of the reference hole transmits a stress to the rigid rod, the value of which is dependent upon that of the local imperfection, whether this be in the form of a hollow or a projection or non-existent. All these stresses staggered along the axis of the rigid rod (for example made of tungsten carbide) are balanced with respect to one another to determine a mean position of the rod, which may be adopted as the practical mean axis of the reference hole. In other words, the pilot rod according to the invention permits the averaging of the imperfections of the reference hole.

The solution according to the invention also provides the following supplementary advantages.

The resilient bearing surface of the pilot rod, in contact with the reference hole, permits the rigidification of the coaxiality of the pilot rod with the practical mean axis found, both under static conditions, at the time of the centering in the reference hole, and under dynamic conditions, when the cutting tool operates in rotation.

In particular, in the course of the rotary operation of the cutting tool, the rotary assembly constituted by the pin and the coaxial pilot rod is supported in rotation on either side of the cutting tool, by two genuine bearing supports, the first constituted by the bush present in the machining head, and the second by the resilient bearing surface of the rod, in local contact with the reference hole. This leads to a genuine coaxial rigidification of the pilot and of the pin, in relation to the reference hole, irrespective of the imperfections of the latter.

The deformable and resilient character of the resilient bearing surface permits the damping of the vibrations, of which the pin and the pilot rod may be the seat.

The annular retention of the pilot rod, at a plurality of places spaced along the axis of the latter, permits the compensation of the force exerted horizontally by the cutting tool at the upper end of the pilot rod.

The axial positioning of the pilot rod in the reference hole becomes far more rapid, or even instantaneous.

BRIEF DESCRIPTION OF THE DRAWINGS

The present invention is now described by reference to the drawings, in which.

DESCRIPTION OF THE PREFERRED EMBODIMENT

Essentially, a grinding machine according to the invention also has the various technical features already described in the Patent No. EP-B-0,022,796. It will be useful to refer to the text of this patent for the constructional details.

Figure 1:
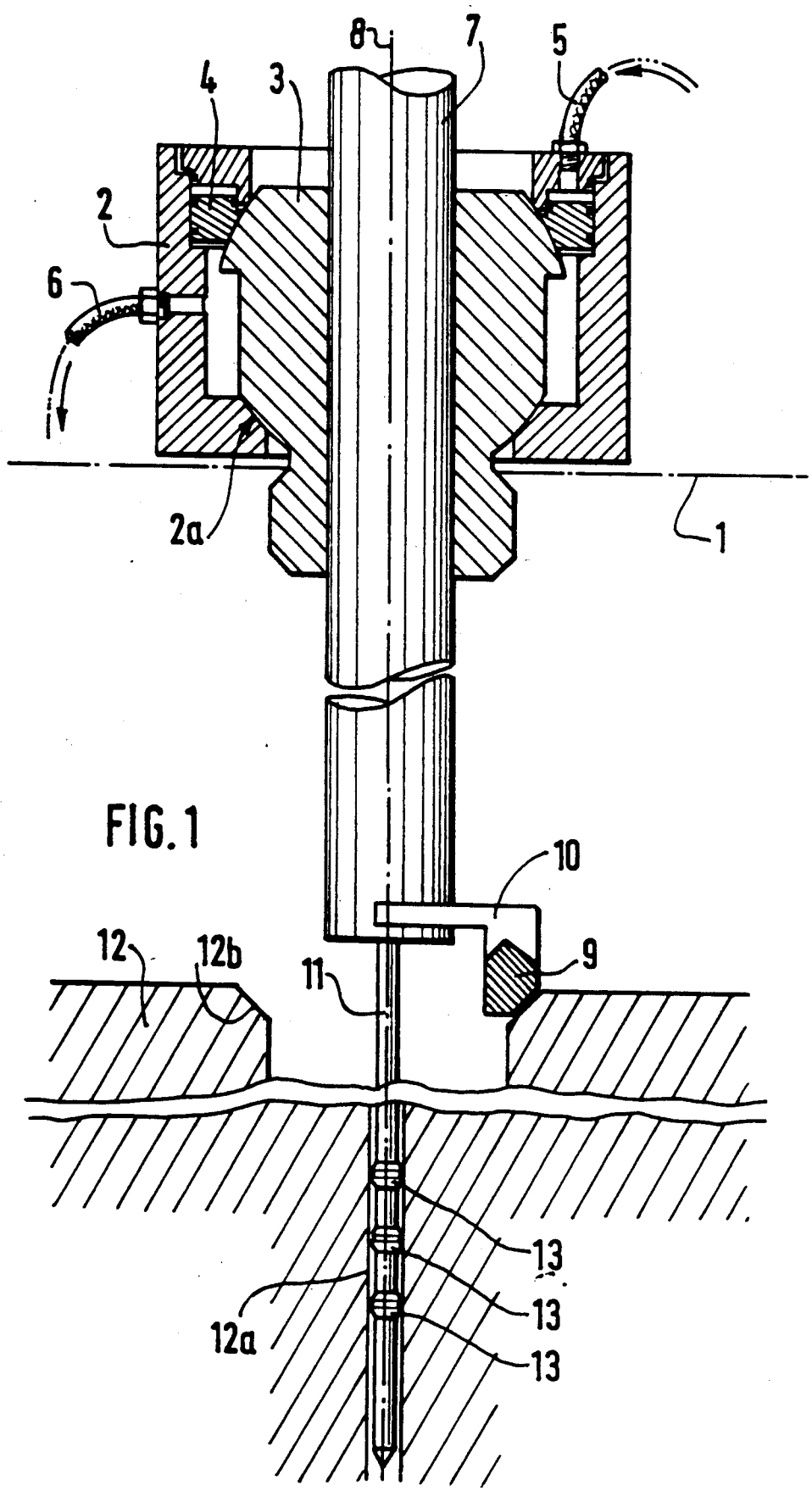
FIG. 1 represents an axial cross-sectional view of a grinding machine according to the invention, in the course of the machining of a valve seating of a heat engine.

Such a machine comprises:

a fixed, flat and horizontal support, not shown, but corresponding to the horizontal line shown in broken lines according to the reference numeral (1) of FIG. 1;

a machining head (2), corresponding to a substantially closed cylindrical casing, disposed on a cushion of air in relation to the fixed table (1) and displaceable on the latter along two perpendicular reference directions;

a bush (3) corresponding to a spherical orientation stop and mounted within the head (2);

two seatings of concave sphericity, which are complementary to the spherical stop (3), one fixed (2a), formed on the lower wall of the head or casing (2), and the other movable (4), in relation to the same wall, but disposed within the head (2); this movable seating (4) is capable of blocking the bush (3) in terms of orientation, by virtue of a displacement in the vertical sense in a downward direction, along the axis of the casing (2), controlled by a source of compressed air (5);

pneumatic means (6), in communication with the gap between the wall of the casing (2) and the bush (3), permitting the lifting of the spherical stop (3) on a cushion of air during the phase of unblocking of the movable seating (4);

a pin (7), movable in rotation about its axis (8), and in translation along the same axis, sliding in the bush (3);

a cutting tool (9), cutting away a chip by rotation of the pin (7), and mounted at the free end of the latter via a tool carrier device (10);

a pilot rod (11), coaxial with the axis of the pin (7), and consequently disposed along the axis (8), extending the said pin at its free end;

a means for driving the pin (7) in rotation, which means is not shown, and integral with the bush (3).

The operation of such a machine may be stated in the following manner:

the pneumatic means (5) are used to raise and to unblock the movable seating (4), and the pneumatic means (6) are used to inject compressed air into the gap situated between the bush (3) and the wall of the cylindrical casing (2); from this instant, the bush (3) and the pin (7) are lifted on a cushion of air, without friction in relation to the casing (2);

by virtue of the pilot rod (11), it is then possible to position the pin (7) along the practical mean axis of the reference cylindrical hole (12a), or valve guide, belonging to a heat engine (12), which means that the valve guide (12a), the pilot rod (11) and the pin (7) are, from this moment, disposed along the axis (8);

then, still by the action of the pneumatic means (5), the movable seating (4) is lowered, and this seating blocks the bush (3) in the aforementioned position;

it is then possible to commence the grinding of the valve seating (12b), by rotary action of the cutting tool (9), by virtue of the corresponding movement of the pin (7).

In the case of a heat engine valve, the expression "practical mean axis" is intended to refer to the position adopted, in operation, by the valve rod; thus, what is involved is a dynamic equilibrium position, integrating the local irregularities of the valve guide.

According to the invention, the pilot rod (11) comprises a plurality of annular recesses (11a), hollowed out in relation to the cylindrical surface of the rod (11), and staggered along the axis and the height of the latter. A plurality of resilient rings (13), which are resiliently deformable in the radial direction, are mounted in the annular recesses (11a) thus defined. Consequently, the shape and the transverse dimensions of each ring (13) take account of and are matched to that of each recess (11a).

The set of these rings (13) forms a resilient bearing (20) of axial extension, consequently attached to the rod (11). The general external contour of such a bearing, unstressed, emerges above the cylindrical surface of the rod (11), by the local ridges (13a) of the rings (13).

Figure 3:
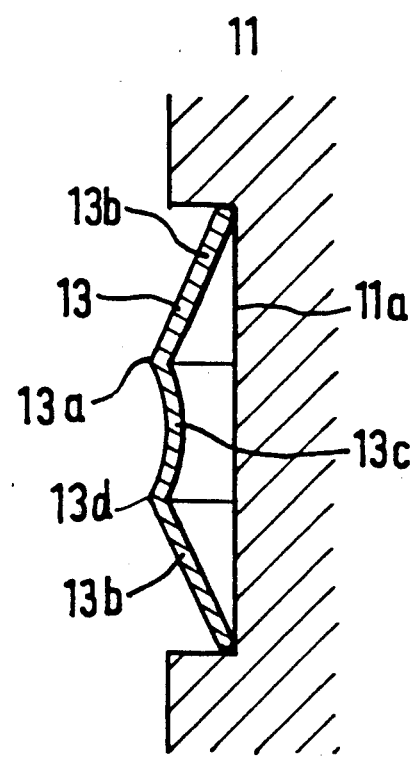
FIG. 3 represents a view on a further enlarged scale of the detail A of the FIG. 2.

As shown by FIG. 3, the external surface (13a) of each ring (13a), unstressed, emerges above the cylindrical surface of the rod (11). Furthermore, as shown by the lower part of FIG. 1, the radial resilient compression under stress of each ring (13) permits the establishment of a peripheral contact between the surface of the reference hole (12a), in the present case the valve guide, and the surface of the rod (11).

As shown by FIG. 3, in transverse profile, each ring comprises two wings (13b) forming between them an obtuse angle directed from the inside towards the outside of the annular recess (11a). These two wings (13b) are separated by a central part (13c) which is concave, seen from the outside of the ring.

The rings (13) are constructed by molding or extrusion of any plastic material, which may or may not be composite, exhibiting at the same time a low coefficient of friction and a good resistance to wear in rotation; the material concerned may be, for example, polytetrafluoroethylene.

Figure 2:
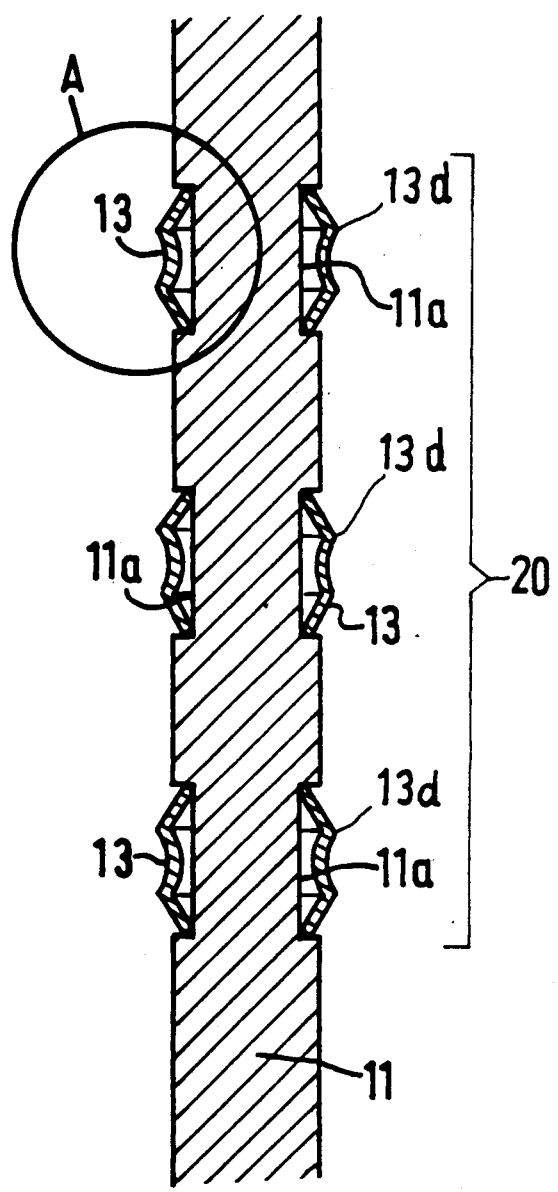
FIG. 2 represents an axial cross-sectional view, on an enlarged scale, of a pilot rod according to the invention.

The rings (13) may be constructed in accordance with any embodiment different from those described with reference to FIGS. 2 and 3. The rings may be solid, and not hollow, and may have a transverse and radial cross-section of different shape or contour.

Figure 4:
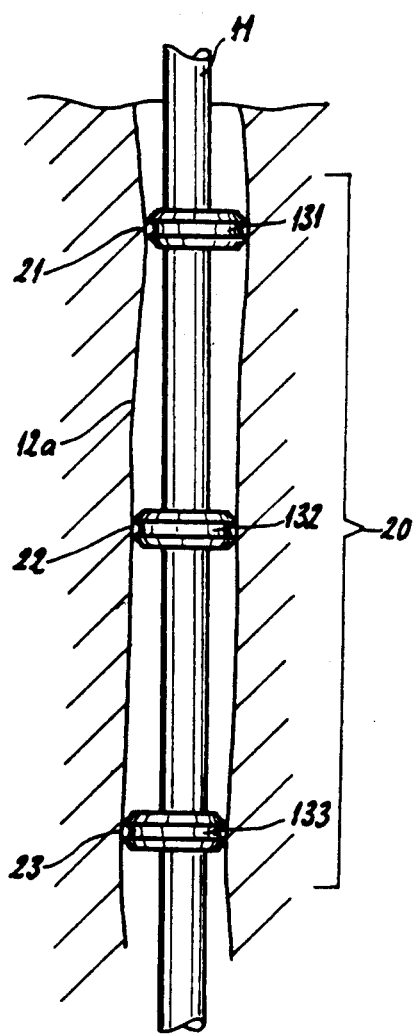
FIG. 4 represents the mode of balancing of a rod according to the invention within a cylindrical hole, a cylindrical hole.

As shown by FIG. 4, and exaggerating the dimensions concerned, the reference hole (12a) exhibits effectively a cylindrical general contour, but comprises, in a staggered manner along its axis, various local defects of concentricity. The spaced rings 131, 132 and 133, belonging to the resilient bearing (20) according to the invention, permit the establishment, under stress, by radial resilient compression of each one, of a plurality of annular zones (21, 22 and 23) of contact between the local surface of the reference hole (12a) and the pilot rod (11); these annular zones of contact are staggered along the axis of the rod (11). The stresses exerted on the rigid rod (11), at the location of the various annular zones of contact which are mentioned above, that is to say towards the right for the zone 21, zero for the zone 22 and towards the left (according to FIG. 4) for the zone 23, balance one another via the rod (11), in such a manner that the latter adopts a mean position representative of the practical mean axis of the valve guide (12a).

Figure 5:
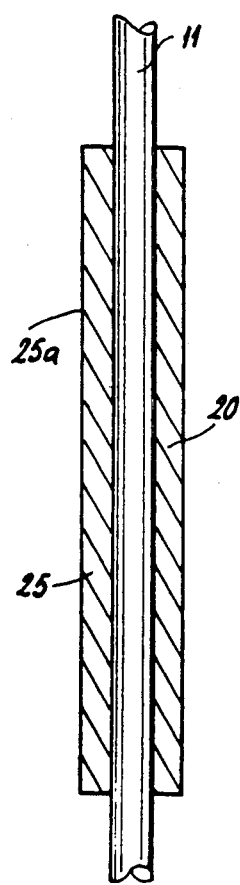
FIGS. 5 and 6 represent two different embodiments of the invention.

According to FIG. 5, the resilient bearing (20) is a resilient sleeve (25) which is continuous along the axis of the pilot rod (11), the external surface (25a) of which emerges above the residual cylindrical surface of the rod (11).

Figure 6:
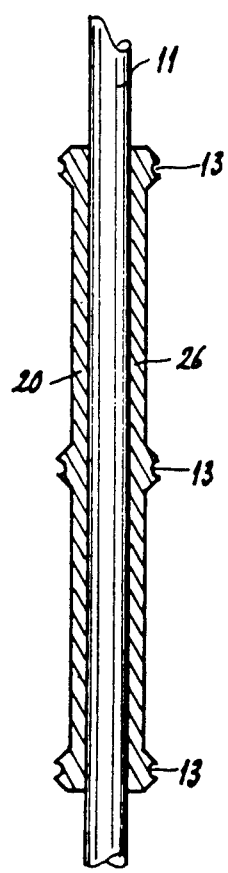

According to FIG. 6, the resilient bearing (20) comprises an annular base (26), which is continuous along the axis of the pilot rod (11) from which the various resilient rings (13) project integrally.

Figure 7:
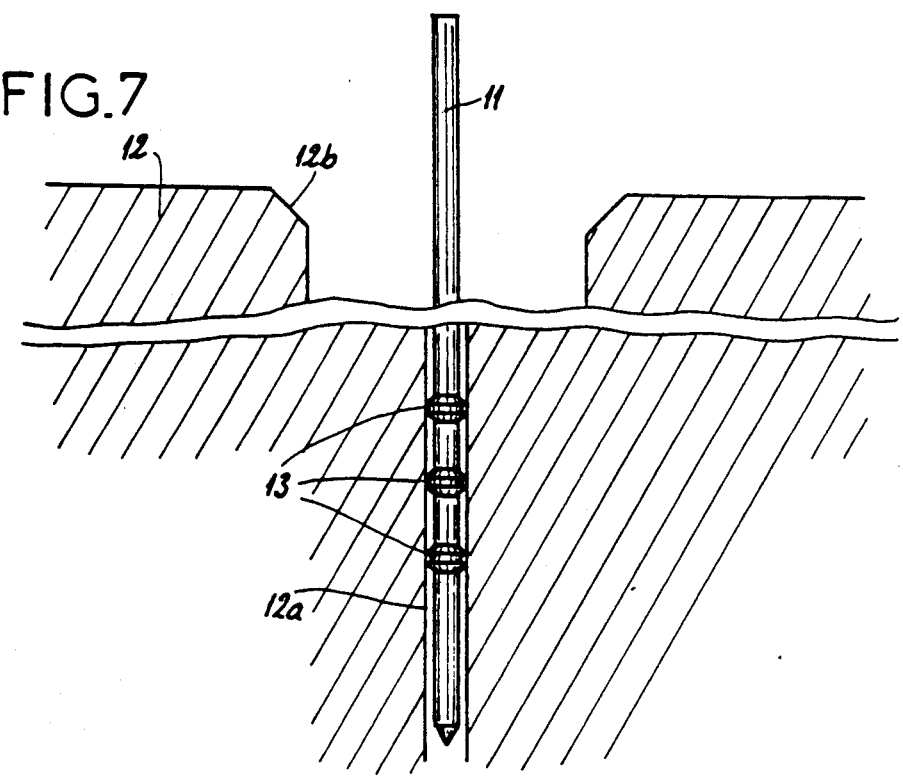
FIGS. 7 and 8 represent two different applications of a rod according to the invention, FIG. 9 diagrammatically represents another machine for machining according to the invention, in which the rod according to the invention serves only as an intermediate link for the determination of the practical axis of the guide of the valve rod.
Figure 9:
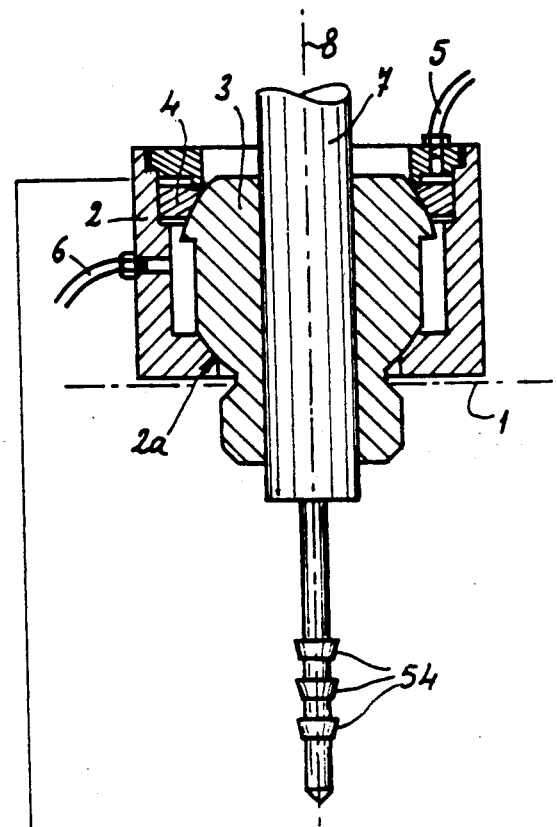
Figure 9:
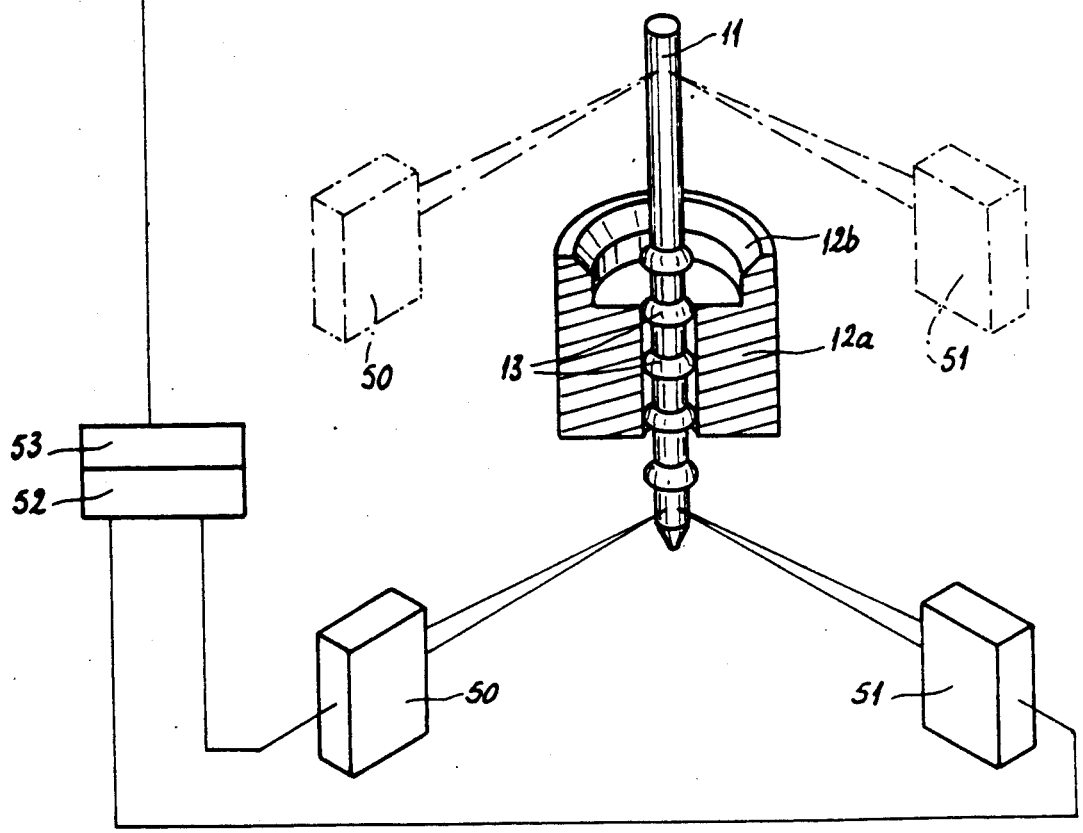

According to FIG. 7, the rod (11) according to the invention described hereinabove may be used as such to determine the practical mean axis of the reference hole (12a). This physical determination or substantive location may be used for various purposes, for example of metrology or measurement, it being possible for the values thus obtained to be utilized for the positioning of a tool, for example.

Where the positioning of a tool is concerned, FIG. 9 shows another machine for machining according to the invention, combining a rod (11) identical to that used previously, but totally distinct from the machining head (2). Such a machine comprises:

means for measuring the equilibrium position adopted in space by the rod (11); these means comprise, for example, two sensors (50) and (51), with or without contact with the rod (11), which are disposed at 90° to one another; these sensors are displaceable in height, from a low position measuring the position of the low end of the rod (11), to a high position measuring the position of the high end of the rod (11); the positions measured for the two ends of the rod are passed into a unit (52) for processing the measurements, means (53) for controlling the displacement of the machining head (2) and/or of the pin (7), to position the latter along the measured position of the rod (11), which is available within the unit (52).

By extraction of the rod (11), in a manual and automatic manner, the reference hole (12a) becomes available for a machining, for example with a surfacing tool (54), carried out precisely along the practical axis of the valve guide (12a).

Figure 8:
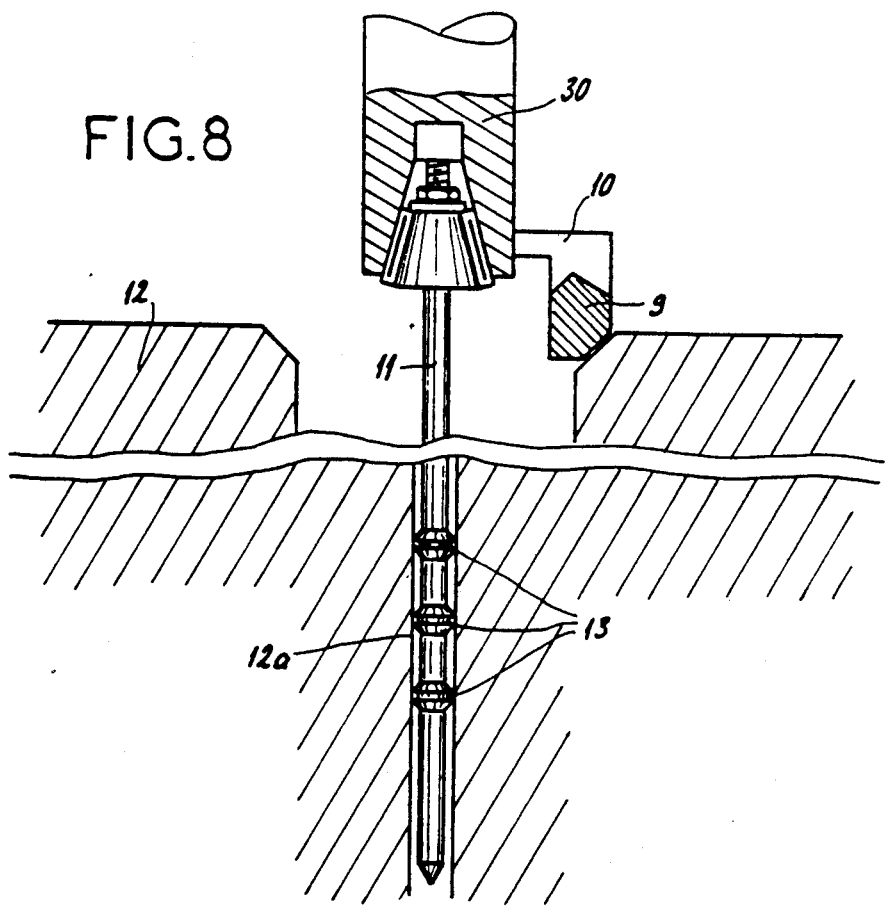

According to FIG. 8, conversely to the mode of operation described by reference to FIGS. 1 and 2, during the machining phase the rod (11) continues to be immovable in rotation, and a head (30) is attached to the free end of the rod (11), while still being movable in rotation in relation to the latter; drive means not shown, whether these be manual means or an electric motor, drive the machining head (30) in relation to the rod (11).

In FIGS. 1 to 9, the transverse cross-section of the resilient bearing (20) has, of course, been exaggerated in such a manner as to provide a better understanding of the invention.

I claim:

1. A machine for precision machining, comprising a spindle which is movable in rotation about its axis and in translation along its axis, which is integral, in terms of rotation, with a machining tool, a pilot rod extending coaxially from said spindle at its free end, said pilot rod having a rigid cylindrical surface its entire length along said axis to which is attached a resilient bearing extending coaxially along the length of said cylindrical surface of said pilot rod, said pilot rod with its resilient earing being intended to be introduced into a reference hole, for example the guide of the valve, of which it is desired to grind the seating, this reference hole exhibiting a cylindrical general contour but local and staggered imperfections along the axis of said reference hole such as local imperfections of concentricity, the resilient bearing being continuous around said pilot rod so as to be capable of establishing under stress, when said pilot rod is in said reference hole, a plurality of annular zones of contact between said reference hole and said resilient bearing, matching the local imperfections, balancing one another along the rigid pilot rod, and also staggered along the axis of said reference hole, an unstressed external surface of said resilient bearing emerging at least locally from the cylindrical surface of said pilot rod when said pilot rod is outside said reference hole.

2. The machine as claimed in claim 1, wherein the resilient bearing is a resilient sleeve which is continuous along the axis of the pilot rod, the unstressed external surface of which emerges above a non-covered portion of the rigid cylindrical surface of said pilot rod.

3. The machine as claimed in claim 1, wherein the resilient bearing comprises a plurality of resilient rings staggered along the axis of the pilot rod, which are resiliently deformable in the radial direction, and the unstressed external surface of which emerges above the cylindrical surface of the pilot rod.

4. The machine as claimed in claim 3, wherein the pilot rod comprises a plurality of annular recesses staggered along the axis of the pilot rod, said plurality of annular recesses hollowed out in relation to the cylindrical surface of the pilot rod for receiving the plurality of resilient rings respectively.

5. The machine as claimed in claim 3, wherein the resilient bearing comprises an annular base which is continuous along the axis of the pilot rod and, from which the resilient rings project integrally.

6. The machine as claimed in claim 3, wherein in transverse profile each resilient ring comprises two wings forming between them an obtuse angle.

7. The machine as claimed in claim 6, wherein in transverse profile the two wings of each resilient ring are separated by a concave central part.

8. A machine for precision machining, comprising a spindle which is movable in rotation about its axis and in translation along its axis and which is integral, in terms of rotation, with a machining tool, a pilot rod extending coaxially from said spindle at its free end, said pilot rod having a rigid cylindrical surface along said axis with a plurality of annular recesses staggered along the length of said axis, each said annular recess defining a position for receiving a continuous resilient ring deformable in the radial direction, the unstressed external surface of each said resilient ring emerging above the cylindrical surface of said pilot rod, said pilot rod with its resilient rings being intended to be introduced into a reference hole, for example the guide of a valve of which it is desired to grind the seating, the reference hole exhibiting a cylindrical general contour but local and staggered imperfections along the axis of the reference hole such as local imperfections of concentricity, said resilient rings of said pilot rod being capable to establish under stress, when said pilot rod is in the reference hole, a plurality of annular zones of contact between the reference hole and said resilient rings, matching the local imperfections, balancing one another along said rigid pilot rod, and also staggered along the axis of the reference hole.

9. A rod for the determination of the practical mean axis of a reference hole exhibiting a cylindrical general contour but local and staggered imperfections along the axis of said hole such as local imperfections of concentricity, in particular a pilot rod for a machine for precision machining, this rod having a rigid cylindrical surface to which is attached a resilient bearing extending from proximate a first end to proximate a tip end coaxially with said cylindrical surface, said resilient bearing being continuous around said rod and having an unstressed external surface which emerges at least locally from the cylindrical surface of said pilot rod, said pilot rod with its resilient bearing being intended to be introduced into the reference hole, for example the guide of the valve of which it is desired to grind the seating, said resilient earing of said pilot rod being capable of establishing under stress, when said pilot rod is in the reference hole, a plurality of annular zones of contact between the reference hole and said resilient bearing, matching the local imperfections, balancing one another along said rigid pilot rod, and also staggered along the axis of the reference hole.

10. The rod as claimed in claim 9, wherein said resilient bearing is a resilient sleeve which is continuous along the axis of said pilot rod, the unstressed external surface of which emerges above a non-covered portion of the rigid cylindrical surface of said pilot rod.

11. The rod as claimed in claim 9, wherein the resilient bearing comprises a plurality of resilient rings staggered along the axis of the pilot rod, said resilient rings are resiliently deformable in the radial direction, an unstressed external surface of each of said resilient rings emerging above the cylindrical surface of said pilot rod.

12. A machine for precision machining, comprising:
a spindle rotatable about a longitudinal axis and adjustable along the longitudinal axis;
a pilot rod having a rigid cylindrical surface extending over substantially an entire length of said pilot rod, said pilot rod extending coaxially from a free end of said spindle; and
an annularly continuous resilient bearing surface at each of at least three locations distributed coaxially along substantially the entire length of said rigid cylindrical surface of said pilot rod from proximate said free end of said spindle to proximate an opposite end of said pilot rod.

13. A guide device for use with an machine for precision machining having a spindle rotatable about a longitudinal axis and adjustable along the longitudinal axis, comprising:
a pilot rod having a rigid cylindrical surface extending over substantially an entire length of the pilot rod, said pilot rod extending coaxially from a free end of the spindle; and
an annularly continuous resilient bearing surface at each of at least three locations distributed coaxially along substantially the entire length of said rigid cylindrical surface of said pilot rod from proximate a free end of the spindle to proximate an opposite end of said pilot rod.

14. A guide device for use in precision machining, comprising:
a pilot rod having a rigid cylindrical surface extending over substantially an entire length of said pilot rod; and
an annular continuous resilient bearing surface at each of at least three locations distributed coaxially along substantially the entire length of said rigid cylindrical surface of said pilot rod from proximate a first end to proximate a second end of said pilot rod.

* * * * *